Figure 1:
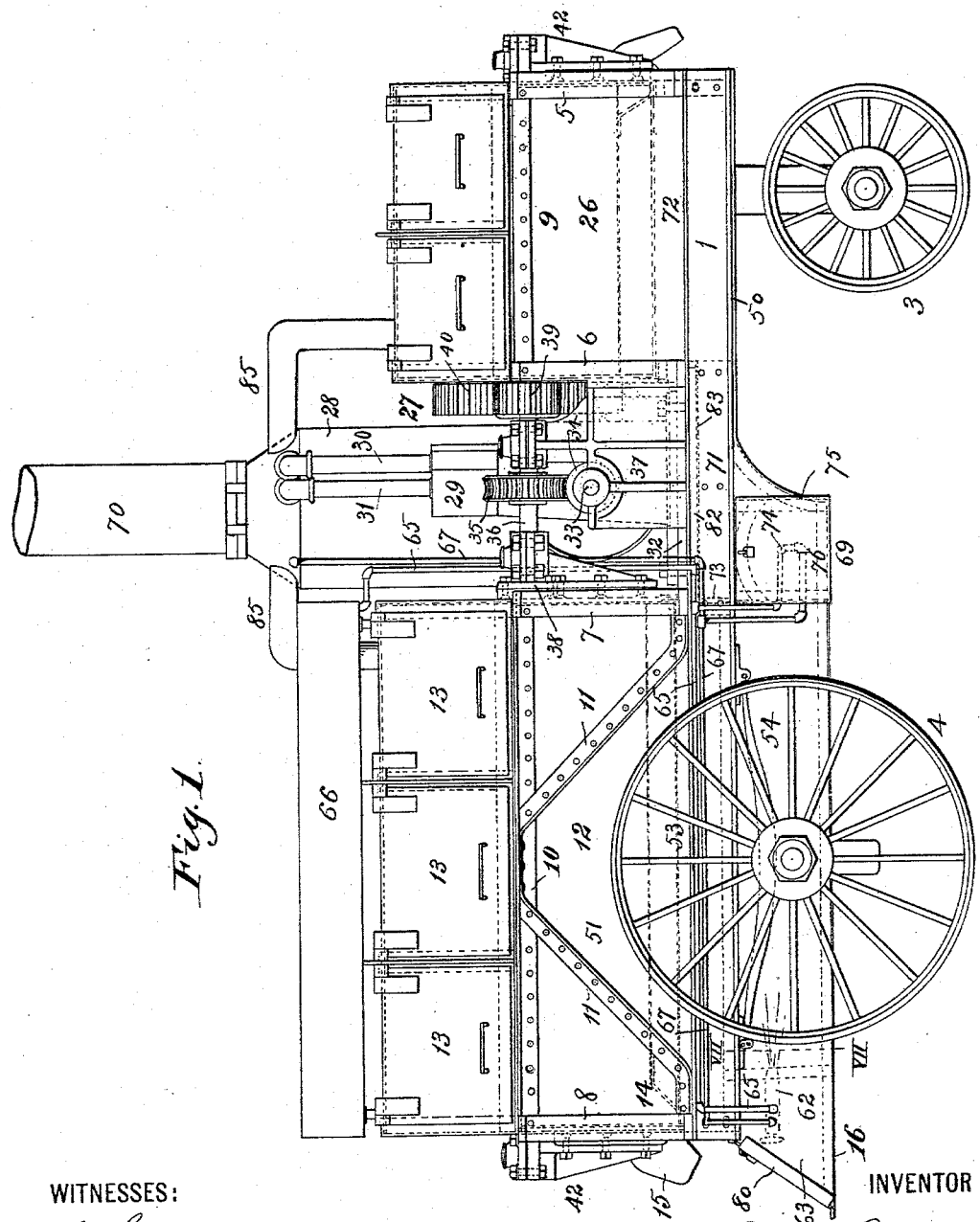

(No Model.)  6 Sheets—Sheet 1.

R. BUTCHER.
MACHINE FOR HEATING AND MIXING ASPHALT.

No. 546,444. Patented Sept. 17, 1895.

WITNESSES:
H. Graham.
E. L. Todd.

INVENTOR
Robert Butcher,
BY Graham & Low
ATTORNEYS (No Model.) 6 Sheets—Sheet 2.
R. BUTCHER.
MACHINE FOR HEATING AND MIXING ASPHALT.

No. 546,444. Patented Sept. 17, 1895.

WITNESSES:
H. Graham
E. L. Todd

INVENTOR
Robert Butcher
BY
Graham & Low
ATTORNEYS.

(No Model.) 6 Sheets—Sheet 3.
R. BUTCHER.
MACHINE FOR HEATING AND MIXING ASPHALT.
No. 546,444. Patented Sept. 17, 1895.
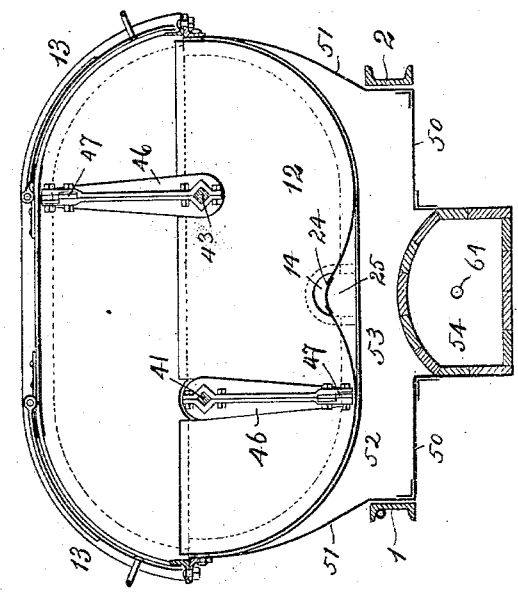
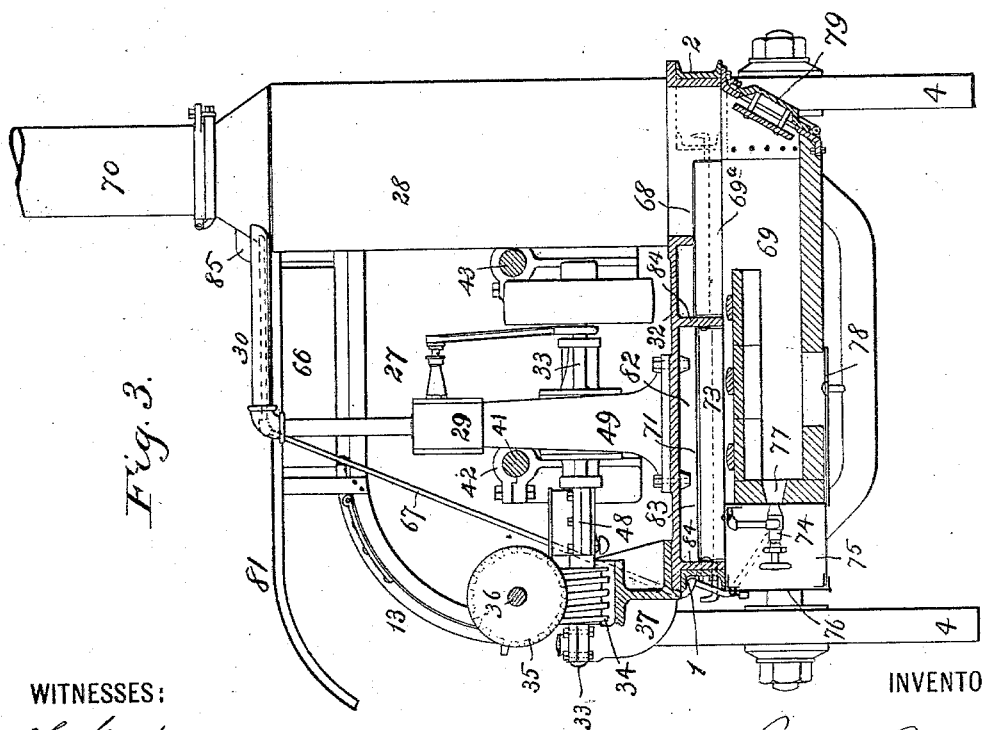
WITNESSES:
H. Graham.
E. L. Todd.
INVENTOR
Robert Butcher
BY Graham & Low
ATTORNEYS.

(No Model.) 6 Sheets—Sheet 4.
R. BUTCHER.
MACHINE FOR HEATING AND MIXING ASPHALT.
No. 546,444. Patented Sept. 17, 1895.
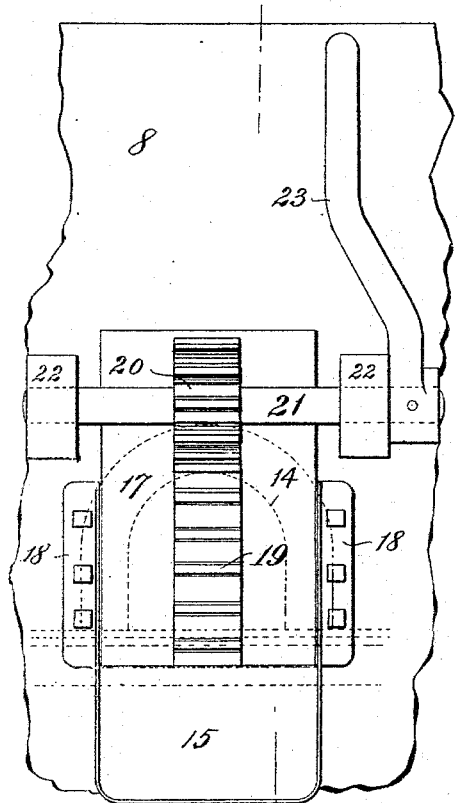
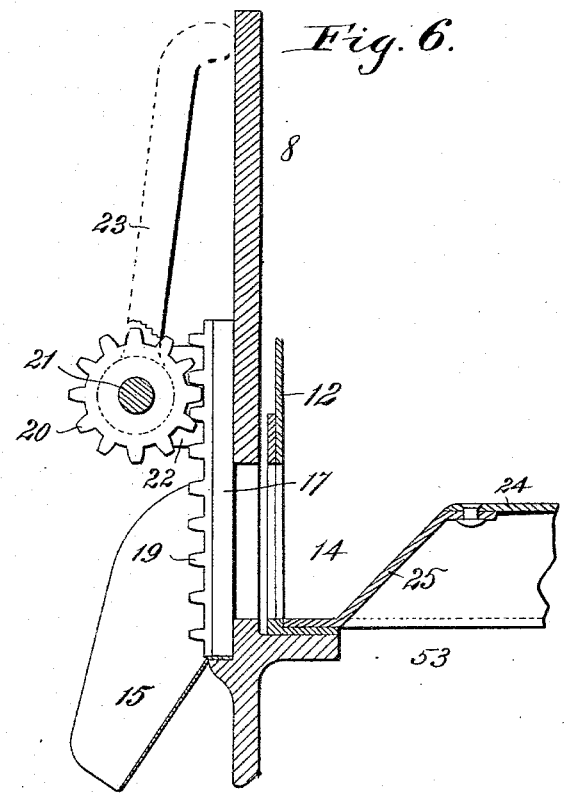
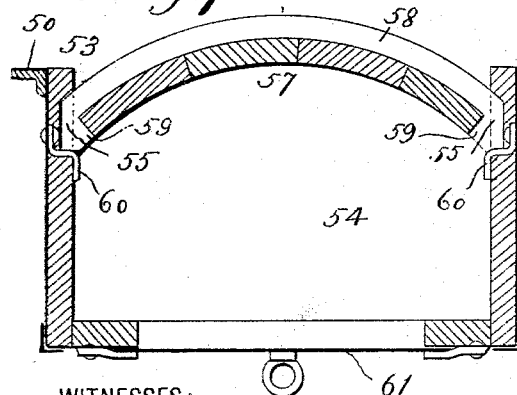
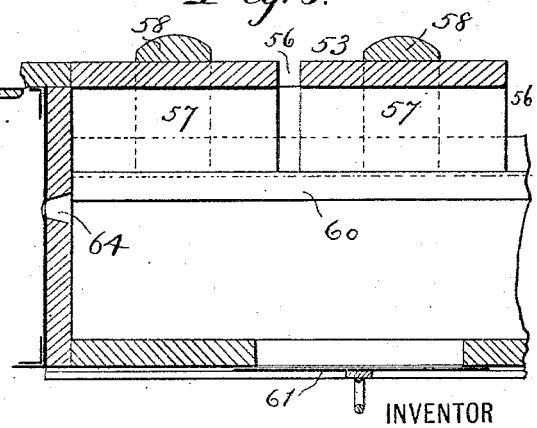
WITNESSES:
H. Graham
E. L. Todd
INVENTOR
Robert Butcher
BY Gorham & Low
ATTORNEYS.

(No Model.)  6 Sheets—Sheet 5.
R. BUTCHER.
MACHINE FOR HEATING AND MIXING ASPHALT.
No. 546,444.  Patented Sept. 17, 1895.
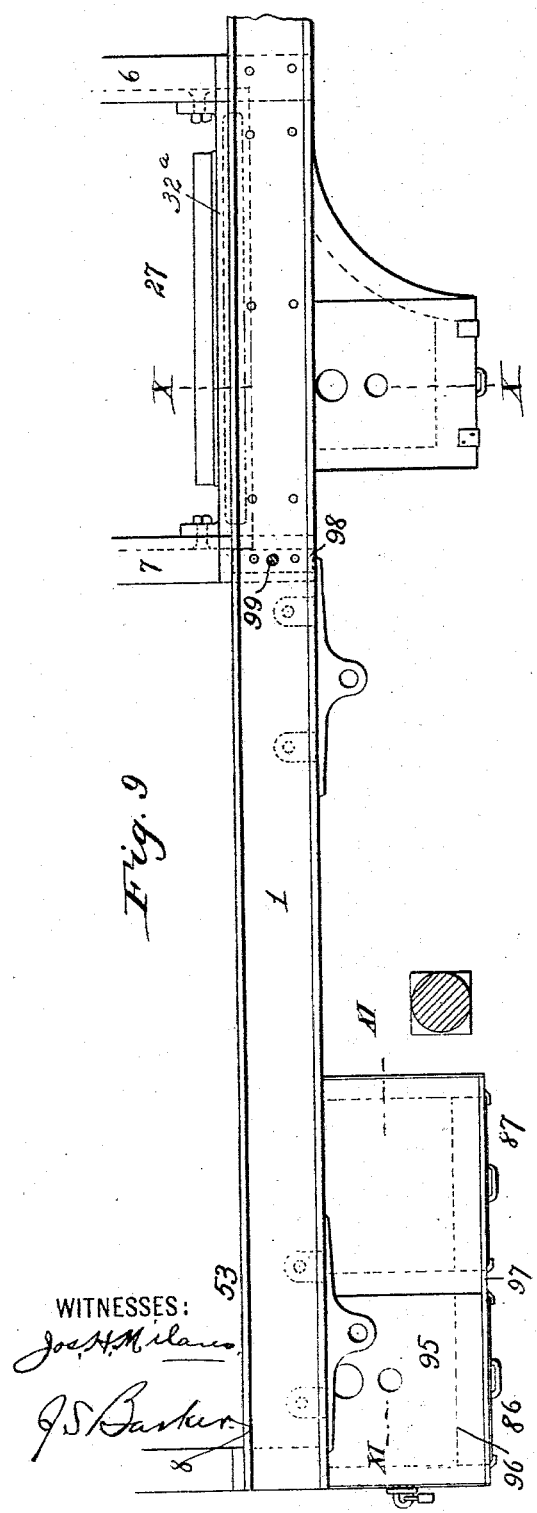
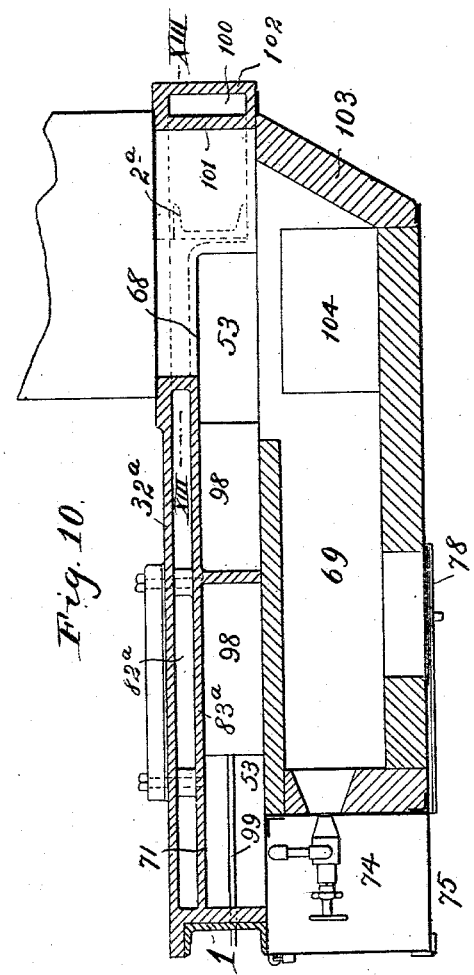
WITNESSES:
Jos. H. Milans
J. S. Barker
INVENTOR
Robert Butcher
BY Graham & Low
ATTORNEYS.

(No Model.) 6 Sheets—Sheet 6.
R. BUTCHER.
MACHINE FOR HEATING AND MIXING ASPHALT.
No. 546,444. Patented Sept. 17, 1895.
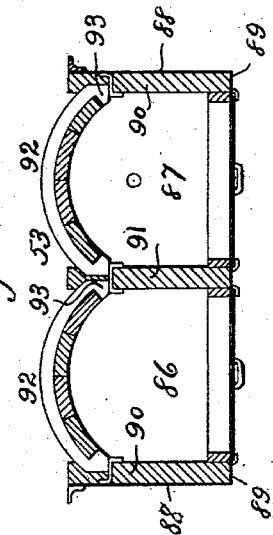
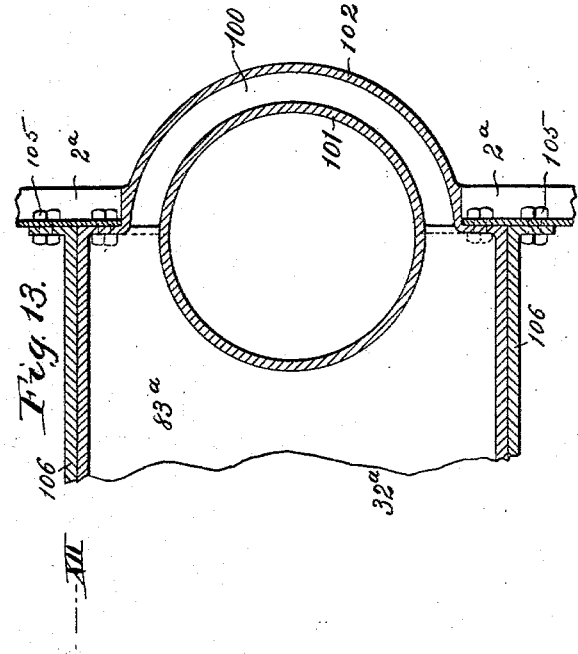
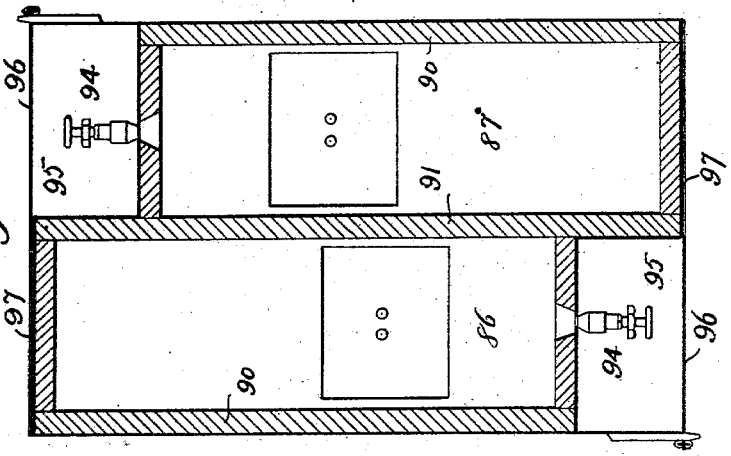
WITNESSES:
INVENTOR
Robert Butcher
BY Graham & Low,
ATTORNEYS.

UNITED STATES PATENT OFFICE.

ROBERT BUTCHER, OF NEW YORK, N. Y.

MACHINE FOR HEATING AND MIXING ASPHALT.

SPECIFICATION forming part of Letters Patent No. 546,444, dated September 17, 1895.

Application filed January 18, 1895. Serial No. 535,376. (No model.)

*To all whom it may concern:*

Be it known that I, ROBERT BUTCHER, a subject of the Queen of Great Britain, residing in the city, county, and State of New York, have invented certain new and useful Improvements in Machines for Heating and Mixing Asphalt, of which the following is a specification.

My present improvements are directed especially to that class of asphalt-mixing machines which are mounted upon wheels and are portable to any point where the asphalt is to be prepared for the laying of a pavement, floor, or roof; but I may state that certain of the novel features of which my invention consists may be availed of in other apparatus than that of a portable character.

My present invention relates to the means for heating the pans for the asphalt or other substance, doing away with the expensive transportation of fuel, and avoiding the subsequent carting of the ashes and other refuse ordinarily left upon the street after the use of the machine, and attaining much convenience and economy in the operation of the machine for the heating not only of the said pans, but also for the generation of steam necessary for the operation of the injector-burners and stirring or agitating devices.

My invention further relates to certain features of construction whereby the machine is made very compact and economical of construction as well as of operation.

With such objects in view my invention consists in the parts and combinations thereof hereinafter more particularly set forth and claimed.

In order to make the invention more clearly understood, I have shown in the accompanying drawings means for carrying the same into practical effect, without limiting my improvements in their useful applications to the particular construction which for the sake of illustration I have delineated.

Figure 2:
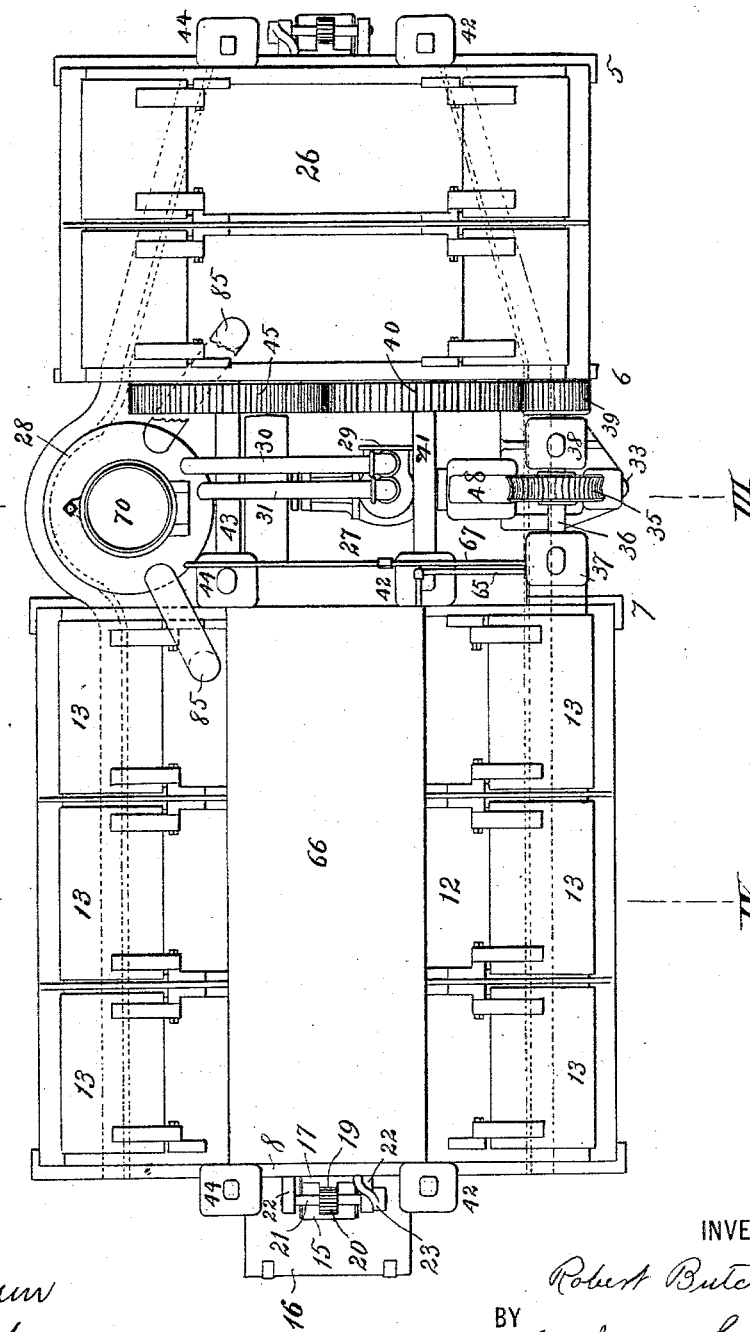

In said drawings, Figure 1 is a side elevation of a machine for heating and mixing asphalt, &c., embodying my invention. Fig. 2 is a plan view of the same. Fig. 3 is a transverse sectional view on line III III, Fig. 2, the boiler and engine being shown in elevation. Fig. 4 is a transverse vertical section of one of the mixing-pans on line IV IV, Fig. 2. Fig. 5 is an elevation of the gate controlling the exit from one of the mixing-pans and its operating mechanism. Fig. 6 is a vertical sectional view on line VI VI, Fig. 5. Fig. 7 is a vertical transverse section on line VII VII, Fig. 1. Fig. 8 is a longitudinal vertical section on line VIII VIII, Fig. 7. Fig. 9 is a side view of the lower portion of the machine, including the bed-plate and the combustion-chambers for the asphalt pan and boiler, showing a somewhat different construction and arrangement, also embodying my invention, of said chambers, plate, and water-heater. Fig. 10 is a vertical transverse sectional view on line X X, Fig. 9. Fig. 11 is a horizontal sectional view on line XI XI, Fig. 9. Fig. 12 is a vertical sectional view on line XII XII, Fig. 11. Fig. 13 is a horizontal sectional view on line XIII XIII, Fig. 10.

The machine illustrated in the foregoing drawings may be considered as an improvement upon that patented to me May 29, 1894, No. 520,560.

Referring to the drawings, it will be seen that the body of the machine is carried by a base-frame, and the latter in turn by a suitable running-gear, such as front and rear wheels 3 and 4, for enabling the apparatus to be readily transported from place to place, according to the exigencies of the work to be performed. Said frame consists of longitudinal side pieces 1 and 2, preferably in the form of wrought channel irons or beams, of suitable horizontal plates of cast or wrought metal supported by said beams and hereinafter more particularly described, and of vertical transverse frames 5, 6, 7, and 8, bolted to said channel-irons and carrying the mixing-pans with their mixing or agitating devices. The said transverse frames are connected by horizontal braces or beams 9 and 10, which latter may be further supported, if desired, by inclined braces 11 rising from the channel-irons, Fig. 1.

12 indicates the asphalt melting and mixing pan, formed of suitable material, such as boiler-iron, and supported by the frame-pieces 7, 8, 10, and 11. The pan is preferably formed, as indicated in cross-section in Fig. 4, so as to admit of two independent sets of rotary stirrers arranged parallel with each other and longitudinally of the pan and turned in opposite directions, so that both stirrers move downward and inward, thereby throwing the asphalt always toward the middle of the pan and preventing it from being carried upward and outward, so as to be wasted over the edges of the pan into the street.

13 indicates one or more covers for the pan 12, mounted over the latter upon suitable frames and arranged so as to be open at either side of the machine to permit the pan to be charged with the lumps of asphalt to be reduced. At the end of the machine the asphalt-pan is provided with a suitable discharge-opening 14 at the lowest point of the pan.

15 is a spout arranged to receive the melted asphalt as it is discharged from said opening and directed into a pocket or other receptacle, which latter may be supported by a platform 16, supported from the frame of the machine below said spout.

17 is a gate or door adapted to tightly close the opening 14 and adapted to be guided, as it slides vertically, by side flanges 18, secured to the frame 8. The door is provided with a rack 19, which is engaged by a pinion 20, the latter being mounted on and actuated by a transverse rock-shaft 21. The latter is mounted in bearings 22, fixed on the frame 8, and may be operated by a handle 23. It may be stated that the opening 14 is formed through the frame 8, as well as the end of the pan proper. The pan being double, as already described, and the walls of its two sides being curved to correspond with the circular paths of the agitating-arm, hereinafter described, there is formed along the middle of the bottom of the pan a longitudinal ridge 24. In order, however, that the melted asphalt may be withdrawn completely from both sides of the pan through the said opening 14, the latter is made in the middle of the end plate of the pan, opposite to the elevated portion 24, and the latter is terminated before reaching the end plate and connected with the latter by a downwardly-extending plate or portion 25, which terminates at the opening 14 on a level with the extreme bottom of both halves of the pan, Fig. 6.

26 indicates the sand mixing and drying pan, supported similarly to the asphalt-pan upon the frame-pieces 5, 6, and 9. It is also of similar form and provided with covers and an exit-opening gate and spout, as already described in the case of the pan 12, but it is preferably of smaller dimensions. The sand-mixing pan is not, however, contiguous to the asphalt-pan, as in my previous patent, already referred to. I have found that I attain advantages of construction and operation by leaving between said pans an intermediate space, which I occupy with the boiler, engine, and mechanism necessary for the actuation of the agitating devices of both pans. Said space is indicated at 27, the boiler at 28, and the engine at 29. The latter is preferably of the vertical type, connected with the boiler and stack by suitable steam supply and exhaust pipes 30 and 31 and mounted upon a base-plate or deck 32, of cast-iron, Fig. 3. The crank-shaft of said engine is indicated at 33, extending transversely of the machine and carrying a worm 34. The latter engages a worm-wheel 35 on a counter-shaft 36, mounted on bearing-brackets 37 and 38, which are respectively attached to the base-plate 32 and to the frame 7.

39 is a pinion on the counter shaft, engaging a gear-wheel 40, which is fixed on a longitudinal shaft 41. This shaft forms the stirrer-shaft for one portion of the asphalt-pan and for the corresponding portion of the sand-pan, extending longitudinally through the machine and mounted in bearing-brackets 42, fixed on the supporting-frames of said pans.

43 is the stirrer for the other half or portion of the pans, similarly mounted on bearing-brackets 44 and actuated by a gear-wheel 45, which is fixed on the shaft and is engaged and turned by the wheel 40. Each of said shafts is provided with a suitable number of agitating or stirring arms 46, the arms of one shaft preferably alternating with those of the other. On the ends of the arms are mounted stirring-blades 47, preferably inclined, as shown, so as to move the lowermost and most thoroughly-melted stratum of the asphalt toward the delivery end of the pan and the upper stratum of the same away from the said delivery end. The operation of the said agitating devices involves considerable longitudinal thrust upon the shaft 33, and the latter is provided with a thrust-bearing 48, connected directly with the engine-frame 49.

50 is a horizontal plate connected with the channel-irons 1 and 2 and forming, together with upwardly-extending side plates 51 and end plates 52, a heating-chamber 53 below the asphalt-pan. A continuation of the plate 50 or a similar plate extends forward beneath the sand-pan and forms, together with suitable side and end plates, a heating-chamber for said pan.

54 is a combustion chamber situated below the chamber 53 and lined with fire-brick, as indicated, Figs. 4, 7, and 8. The parts composing the top of the chamber 54 are so arranged as to leave longitudinal openings 55 and transverse openings 56, through which the products of combustion may pass from the said chamber into the heating-chamber 53, so as to effect the heating of the asphalt-pan and the melting of the asphalt. For the purpose of forming said openings I prefer to support the fire-brick composing the top of the combustion-chamber in the form of separate arches 57, carried by cast-iron arched ties 58, having shoulders 59, against which the ends of the arches 57 rest. Said ties are mounted upon supporting-brackets 60, riveted to the side walls of the combustion-chamber. The bottom of the chamber may be provided with a door or damper 61.

For the generation of the heat required for the operation of the machine I employ an injector-burner, preferably of the character patented to W. B. Wright, August 14, 1894, No. 524,369. Said burner is indicated at 62 mounted in a box 63 at the rear end of the machine, in line with about the center of the combustion-chamber, and having its nozzle introduced through an aperture 64 in the rear wall thereof. The burner is fed by an oil-pipe 65, leading from an oil-reservoir 66, the latter being preferably mounted above the asphalt-pan, and by a steam-pipe 67 from the dome of the boiler 28. The action of the burner when in operation is such as to send a flame of great heating power and force through the combustion-chamber 54, portions of the heat from which flame are distributed through the openings 55 and 56 to the heating-chamber of the asphalt-pan, while the latter is guarded from too great heat by the arches 57. The whole length of the pan is thus evenly heated to the desired degree. From the chamber 53 the flame and products of combustion may pursue either of two courses, according to the adjustments of the machine. The direct force is through an opening 68 into a transverse combustion-chamber 69 below the boiler, from which chamber they may pass upward through the boiler-flues, effecting or aiding the necessary generation of steam in the boiler, to the stack 70. The opening 68 is provided with a damper 69$^a$, which may be closed, so as to prevent the direct exit of the flame from he burner 62 in the manner just described. When obstructed by the damper 69$^a$, the said flame and products of combustion pass through a flue 71, over and independently of the combustion-chamber 69, and into the heating-chamber 72 beneath the sand mixing and drying pan 26, Figs. 1 and 3. In said chamber 72 the products of combustion circulate, heating the pan 26 and drying the contents thereof, and then pass, on the left-hand side of the machine, into the transverse combustion-chamber 69 and out through the boiler-flues and stack. When the sand-drying pan is not being used, or when it has been sufficiently heated, the supply of heat thereto may be stopped or diminished by a damper 73, arranged in the flue 71. This damper being closed and the damper 69$^a$ being open the products of combustion will pass directly to the boiler, as first above described. The combustion-chamber 69 may be considered as an auxiliary heating means for the boiler, to be used when the heat from the burner 62 is insufficient. Said auxiliary heating means may be employed only when the heat from the main combustion-chamber 54 is used for the sand-drying pan, or it may be employed in greater or less degree at all times in connection with the main heating devices. The burner for the combustion-chamber 69 is indicated at 74 and is preferably of the same type as the burner 62. It is mounted in a box 75, Fig. 3, provided with a door 76, and has its nozzle fitted to an aperture 77 in the outer end of the combustion-chamber. The latter is lined with fire-brick and has in its bottom a door or damper 78. At the other end of the combustion-chamber 69 I provide a door 79, through which solid fuel may be charged into the combustion-chamber for the initial generation of steam before the injector-burners can be employed. The box 63 is provided with a hinged door 80, and both this and the door 76 are provided with padlocks to prevent tampering with the burners. The engine is preferably provided with a housing 81, as indicated in Fig. 3, for protection against the weather. In order to protect the deck 32, upon which the engine stands, from the high temperature of the flues below it and also to preliminarily heat the water for the boiler, I form immediately upon the under side of said deck a water-reservoir 82. This protecting-chamber and feed-water heater is preferably formed by horizontal wrought-iron plates 83, riveted to flanges 84, formed on the under side of the deck 32. The heater 82 may be in constant communication with the boiler, so as to form a part thereof, or may be connected by a pipe provided with a controlling-cock in any well-known manner.

By the above-described relative arrangement of the pans, their heating-chambers and connecting-flues, the boiler, the feed-water heater, and the auxiliary combustion-chamber the fuel delivered to the injector-burners is economized to the full extent and the heating of the whole machine is efficiently performed with great convenience and at slight expense. Great compactness and considerable economy in construction of the machine are also attained by the said arrangement.

It being the object to remove moisture both from the asphalt and from the sand, I connect with the space above the mixing-pans and below their covers vent-pipes 85, which lead to the boiler-stack. The blast in the latter induces a current of moisture-charged air from the said pans.

I will now describe certain features of construction which are new and which also embody my invention. These relate especially to the construction and arrangement of the combustion-chambers for the asphalt-pans, whereby the rear as well as the forward ends of said pans are more evenly heated, and to the construction of the engine bed-plate, whereby it is enabled to better resist the high degree of heat to which it is exposed from the subjacent combustion-chamber and is made available for the heating of the feed-water. It will be understood that said last-mentioned construction of combustion-chambers and bed-plate may, if desired, be employed instead of those hereinbefore described.

Referring especially to Figs. 9 to 12, 86 87 indicate transverse combustion-chambers situated under the rear end of the asphalt-pan-heating chamber 53. Their outer walls 88 are supported from the frame of the machine and carry a bottom plate 89. The walls are lined with fire-brick 90, and the two combustion-chambers are divided by a fire-brick partition 91. The tops of the chambers 86 87 are composed of fire-brick arches 92, constructed similarly to the arches 57, already described, so as to leave openings 93 into the heating-chamber 53. The combustion-chambers are each provided with an injector-burner 94, said burners being situated at opposite sides of the machine in boxes 95, formed at the ends of the combustion-chambers and adapted to be closed and locked by doors 96, sliding in ways 97, so as to prevent the burners from being tampered with, Fig. 11. By this arrangement the heat is not thrown too suddenly to the front end of the chamber 53, but passes more gradually through the machine and is evenly distributed under the asphalt-pan and the rear end of the latter raised to the proper temperature. The front end of the chamber 53 has two exits 68 and 71, as already described, one for the products of combustion which are to pass direct to the boiler-flues and the other for such products when they are first to pass through and heat the chamber 72 under the sand-pan. For the purpose of exposing that one of the two openings desired to be used as an exit and closing the other, or of partly opening one and partly closing the other, so as to divide the products of combustion and modify the heating effect upon the sand-pan, I may provide said openings with a movable damper, preferably of fire-brick or tile, adapted to be changed or partly changed from one opening to the other. Such damper is shown at 98, Figs. 9 and 10, and is furnished with a rod 99 or other suitable means, whereby it may be moved laterally of the machine to regulate the openings, as aforesaid.

In Figs. 9, 10, and 13 I have further illustrated an improved form of combined engine bed-plate and feed-water heater, which may be substituted for the parts 32 83 84 already described. According to this improvement the bed-plate 32ª is cast with a lower parallel plate 83ª, leaving an intermediate feed-water chamber 82ª. This chamber extends not only to the boiler, but around the base of the same, Fig. 13, in the form of an annular passage 100, contained between inner and outer walls 101 and 102. The whole engine bed-plate or deck of the space 27 is thus protected from the heating-chambers below, and the part of the frame exposed to the greatest heat—namely, the wall 101—is prevented from being made red hot. The heat applied at this point is furthermore completely utilized in the raising of the temperature of the feed-water. For better protection from the blast from the burner 74 I may also substitute for the door 79 a fire-brick wall 103 at the end of the combustion-chamber 69 and form the entrance to said chamber at one side, as shown at 104. With the above-mentioned formation of bed-plate I prefer to employ, instead of the continuous channel-iron 2, passing around the base of the boiler, two separate beams 2ª, Fig. 13, bolted to the bed-plate and to cross frame-pieces 106 at 105.

What is claimed is—

1. In an asphalt machine, the combination of a portable frame or platform, mixing pans at each end thereof, heating devices and chambers beneath the pans, a boiler and engine intermediate of said pans, a feed water heater beneath the engine, and agitating devices in the pans connected with said engine, substantially as set forth.

2. In an asphalt mixing machine, the combination of a frame or platform, mixing pans at each end thereof, heating devices and chambers beneath the pans, an engine intermediate of said pans, a feed water heater beneath the engine, longitudinal stirrer shafts passing through both of said pans and provided with agitating or stirring arms, and connections between the engine and said shafts, substantially as set forth.

3. In an asphalt mixing machine, the combination of a frame or platform, mixing pans at each end thereof, heating devices beneath the pans, an engine intermediate of said pans, a feed water heater beneath the engine, agitating devices in the pans connected with the said engine and continuous heating chambers beneath said pans, substantially as set forth.

4. In an asphalt mixing machine, the combination of a frame or platform, mixing pans at each end thereof, an engine and boiler intermediate of said pans, agitating devices in the pans connected with the engine and a continuous heating chamber beneath said pans and communicating with the boiler flues, substantially as set forth.

5. In an asphalt mixing machine, the combination of a frame or platform, mixing pans at each end thereof, heating devices and chambers beneath the pans, an engine intermediate of said pans, a feed water heater beneath the engine, longitudinal stirrer shafts situated in said pans, a worm on the engine shaft, a counter-shaft having a worm wheel operated by said worm and gearing connecting the stirrer shafts with said counter shaft, substantially as set forth.

6. In an asphalt mixing machine, the combination of a frame or platform, independent asphalt and sand pans mounted thereon, a heating chamber below the asphalt pan, a combustion chamber communicating with the said heating chamber, an injector burner in said combustion chamber, a heating chamber below the sand pan communicating with the first mentioned heating chamber, a boiler and engine, and communications between the heating chambers and the boiler flues, substantially as set forth.

7. In an asphalt mixing machine the combination of two mixing pans, a boiler, a heating chamber below one of said mixing pans and communicating with the flues of said boiler, a damper controlling such communication, a heating chamber below the other pan and also communicating with the boiler flues and a damper-controlled communication between the heating chambers of said pans, substantially as set forth.

8. In an asphalt mixing machine the combination of a mixing pan, a boiler, a heating chamber beneath said pan and communicating at one end with the boiler flues, an injector burner for supplying heat to said chamber at its other end and a steam pipe connecting the boiler with said burner, substantially as set forth.

9. In an asphalt mixing machine, the combination of a frame or platform, mixing pans at the ends thereof, a boiler and engine intermediate of said pans, a platform or deck supporting said engine and boiler, a feed water heater formed below said deck and communicating with the boiler, heating chambers below said pans, and a flue connecting said chambers and contiguous to said feed water heater, substantially as set forth.

10. In an asphalt mixing machine, the combination of a frame or platform, mixing pans and a boiler mounted on said platform, heating chambers beneath the pans, an injector burner for supplying heat to said chambers, and a transverse auxiliary heating chamber and burner for supplying heat to the boiler flues, substantially as set forth.

11. In an asphalt mixing machine provided with mixing devices, an engine and a boiler, a transverse combustion chamber for heating said boiler and provided with an injector burner and a fuel door near the boiler, as set forth.

12. In an asphalt mixing machine provided with a boiler, the transverse combustion chambers for heating respectively the asphalt pan and the boiler, both of said chambers having communication with the boiler flues, and injector burners for said chambers, as set forth.

13. In an asphalt mixing machine, a double mixing pan provided with two sets of longitudinal stirring devices and a central elevation along its bottom, a downwardly extending plate 25 terminating said elevation, a central discharge opening at the lower end of said plate, and a gate for the opening, substantially as set forth.

14. In an asphalt mixing machine, a combustion chamber provided with the transverse arches and ties, and an injector burner arranged to deliver its blast into said chamber, which blast is distributed by said arches as set forth.

15. The combination with the asphalt pan and its heating chamber, of the combustion chamber having the supports 60, ties 58 carried by said supports, arches 57 held by the ties, and burner 62.

16. In an asphalt mixing machine the combination, with the heating and mixing pan, of a longitudinal heating chamber for the latter communicating at its forward end with a flue, a transverse combustion chamber beneath the rear end of said heating chamber, and an injector burner for the latter, substantially as set forth.

17. In an asphalt mixing machine the combination, with the pan, of a longitudinal heating chamber beneath the same, transverse combustion chambers beneath the heating chambers and oppositely directed injector burners for said combustion chambers, substantially as set forth.

18. The combination with the pans, engine and boiler, of the deck or bed plate between said pans and formed with a feed water heating space 100 extending to the outer side of the base of the boiler, substantially as set forth.

19. The combination with the pans, their communicating heating chambers, and the boiler and flue, of the sliding damper 98 between said heating chambers for directing the products of combustion from one of said heating chambers to said flue immediately, or mediately of the second heating chamber, substantially as set forth.

In witness whereof I have hereunto signed my name in the presence of two witnesses.

ROBERT BUTCHER.

Witnesses:
GEO. H. GRAHAM,
H. N. LOW.